United States Patent Office 2,973,392
Patented Feb. 28, 1961

2,973,392

STABILIZATION OF HALOHYDROCARBONS

George Whitlock Graham, Beloeil Station, Quebec, Canada, assignor to Canadian Industries Limited, Montreal, Quebec, Canada, a corporation of Canada No Drawing. Filed July 20, 1959, Ser. No. 828,010

Claims priority, application Great Britain Aug. 15, 1958

2 Claims. (Cl. 260—652.5)

This invention relates to the stabilization of halogenated hydrocarbons and, more particularly, to the inhibition of the decomposition of trichloroethylene encountered in metal degreasing.

In vapour degreasing operations, trichloroethylene is continuously boiled and is thus subject to heat and contamination from the metal parts being degreased. This contamination is usually caused by metal chips, water, cutting oils, buffing compounds and the like, normally used in metal machining operations.

Under these conditions, trichloroethylene undergoes decomposition very rapidly with the formation of acidic compounds which are corrosive to the metal parts being degreased and to the degreasing equipment and also act as catalysts for further decomposition of the solvent. It is known that the decomposition becomes more rapid as the solvent becomes more acid.

It has long been common practice to add organic bases such as amines to trichloroethylene both to prevent corrosion of metal samples and to inhibit further acid-catalyzed decomposition of the solvent. It has more recently been claimed, for example in United States Patent No. 2,797,250, that the addition to the amine-containing solvent of cyclic ethers, otherwise known as epoxides, forms a synergistic amine-epoxide combination which absorbs the acid, and thus enables a greater acid absorbtion capacity to be included in the solvent without an excessive use of amine. It is known that too much amine may cause corrosion problems.

However, the epoxides which have been suggested heretofore as synergistic with the amines in the stabilization of trichloroethylene are those that are well known to react with acids in the presence of amine catalysts. Thus it has been found that such a system is efficient only when a degreaser is operating under such conditions that the pH of the solvent is on the alkaline side, i.e. if there is amine present to catalyze the reaction of the formed acid with the epoxide. Once the pH falls substantially below seven, all the amine is tied up as the non-volatile amine salt which is removed from the degreaser with the oil when the trichloroethylene is distilled. None is left to inhibit the decomposition or to catalyze the acid-epoxide reaction and since the decomposition is accelerated by acids, the solvent rapidly fails. Degreasers using trichloroethylene stabilized by an epoxide-amine mixture of the prior art have thus been known to go sour despite the presence of an adequate amount of epoxide.

It has now been found that certain epoxides do not require an amine catalyst in order to react with acids and that, in degreasers, such epoxides will continue to absorb acid in trichloroethylene solution even if the pH falls well below seven, and indeed will react comparatively rapidly with an amine salt to release the free amine and return the solvent to a higher pH. The epoxides which require an amine catalyst will react with an amine salt only slowly, if at all. However, the epoxides which are reactive on the acid side are generally of high boiling point and thus, if used as the only epoxide constituents in a degreasing solvent, would tend to concentrate themselves in the sump. Furthermore, the known epoxides which require an amine catalyst are in some cases more efficient when the pH of the solvent is over seven. Thus a mixture of both types of epoxides provides the best performance in the epoxide-amine stabilization of trichloroethylene, since it is known that the pH can be quite different in the various compartments of a working degreaser so that effective stabilization is required over a considerable pH range.

It is therefore an object of this invention to provide an improved method of stabilizing trichloroethylene. A further object is to provide an improved trichloroethylene degreasing solvent which is stable under difficult degreasing conditions. Additional objects will appear hereinafter.

These objects are accomplished by incorporating with trichloroethylene, containing from about 0.001 to 0.2% by weight of an amine stabilizer, at least one epoxide selected from the group consisting of propylene oxide, butylene oxide, the 2-methyl-butene oxides, butadiene dioxide, epichlorhydrin, hexylene oxide, heptylene oxide and octylene oxide, and at least one other epoxide selected from the group consisting of styrene oxide, α-methyl-styrene oxide, α-pinene oxide, limonene monoxide and limonene dioxide.

The amine used to stabilize the trichloroethylene may be any basic amine such as the pyridines or picolines, or straight or branched chain or aromatic amines such as triethylamine, diisopropylamine or aniline. The amine stabilizer must be soluble in the solvent, must possess at least some volatility at the boiling point of the solvent, and must both react with the acids formed by the decomposition of trichloroethylene and catalyze the reaction of the acids with the first known class of epoxides mentioned above. Tertiary amines are particularly suitable since certain primary and secondary amines form with epoxide addition products of reduced activity. Suitable amounts of amine range from about 0.001% to 0.2%, by weight of the trichloroethylene, but may be lowered by the addition of other known stabilizers to trichloroethylene. Examples of such stabilizers are N-methy pyrrole and diisobutylene, and compositions containing such stabilizers are within the scope of this invention.

Suitable amount of each type of epoxide range from about 0.01% to 1.0%, by weight of the trichloroethylene, but greater amounts may be used and will be effective. Economic considerations will normally prohibit the use of such large amounts, but they are of course included within the scope of this invention.

The following examples are intended to illustrate this invention but in no manner to limit the scope thereof.

EXAMPLE 1

200 ml. portions of trichloroethylene to which 0.02% by weight of N-methyl pyrrole and 0.003% by weight of triethylamine were added, were adjusted to the desired pH with trichloroacetic acid. The designated epoxide was then added to the trichloroethylene and the solution was placed in a reflux apparatus. The solution was refluxed and samples removed at various time intervals for pH and titration measurements in order to follow the rate of the reaction. The results and the conditions under which the experiments were carried out are summarized in the following tables.

Table I

EXPERIMENTS CONDUCTED UNDER ACIDIC CONDITIONS

| Epoxide | Refluxing Conditions | | | |
|---|---|---|---|---|
| Species | Moles | Time "Min." | pH | Titration (N/10 NaOH), ml. |
| Propylene oxide | 0.0138 | 0 | 2.8 | 0.56 |
| Do | 0.0138 | 8 | 3.2 | 0.29 |
| Do | 0.0138 | 22 | 3.4 | 0.15 |
| Combination: | | | | |
| Propylene oxide | 0.0069 | 0 | 2.9 | 0.54 |
| Styrene oxide | 0.0069 | | | |
| Propylene oxide | 0.0069 | 8 | 3.5 | 0.12 |
| Styrene oxide | 0.0069 | | | |
| Propylene oxide | 0.0069 | 22 | 4.1 | 0.004 |
| Styrene oxide | 0.0069 | | | |

Table II

EXPERIMENTS CONDUCTED UNDER ALKALINE CONDITIONS

| Epoxide | Refluxing Conditions | | | |
|---|---|---|---|---|
| Species | Moles | Time "Min." | pH | Titration (N/10 HCl), ml. |
| Styrene oxide | 0.0138 | 0 | 7.0 | 0 |
| Do | 0.0138 | 8 | 7.8 | 0.08 |
| Do | 0.0138 | 30 | 7.9 | 0.20 |
| Combination: | | | | |
| Styrene oxide | 0.0069 | 0 | 7.0 | 0 |
| Propylene oxide | 0.0069 | | | |
| Styrene oxide | 0.0069 | 8 | 7.9 | 0.10 |
| Propylene oxide | 0.0069 | | | |
| Styrene oxide | 0.0069 | 30 | 8.6 | 0.55 |
| Propylene oxide | 0.0069 | | | |

It can be seen that under both acid and basic conditions the mixture of epoxides absorbs acid and brings up the pH better than the single epoxide.

EXAMPLE 2

In an experiment similar to that of Example 1, a sample of trichloroethylene containing these ingredients was refluxed:

|  | Mole/litre |
|---|---|
| Triethylamine | 0.000286 |
| N-methyl pyrrole | 0.00360 |
| Dichloroacetic acid | 0.00242 |
| Epoxide | 0.5 |

The amount of epoxide was increased above that normally used in order to demonstrate the effects in a short time. The proportion of the acid remaining after 100 minutes refluxing is given in Table III for various epoxides.

Table III

| Epoxide | Proportion of acid remaining after 100 minutes, percent |
|---|---|
| 2-methyl butene-2 oxide | 75 |
| Butadiene dioxide | 59 |
| 2-methyl butene-1 oxide | 58 |
| Propylene oxide | 36 |
| Butylene oxide | 32 |
| Octylene oxide | 67 |

In a similar experiment wherein the triethylamine was omitted, the following results were obtained.

Table IV

| Epoxide | Proportion of acid remaining after 100 minutes, percent |
|---|---|
| Butylene oxide | 82 |
| Limonene monoxide | 39 |
| Styrene oxide | 25 |
| α-Pinene oxide | 8.5 |
| Limonene dioxide (0.25 mole/litre) | 4.0 |

It can be seen that the fastest reacting of the epoxides requiring an amine catalyst (butylene oxide) is very slow in the absence of such a catalyst, whereas the four last named epoxides of Table IV are adequately fast.

EXAMPLE 3

In Table V are listed the pH values of trichloroethylene in the boiling tank of a working degreaser. In one column are the values for a period when a degreasing solvent of the prior art was in use, while in the other column are the values for a period of similar use of the improved solvent of this invention. The two solvents had the following compositions:

|  | Solvent of the Prior Art, percent by weight | New Solvent, percent by weight |
|---|---|---|
| Triethylamine | 0.0025 | 0.0025 |
| N-methyl pyrrole | 0.020 | 0.010 |
| Diisobutylene | 0.30 | 0.15 |
| Propylene oxide | 0.20 |  |
| Butylene oxide |  | 0.25 |
| Styrene oxide | 0.20 | 0.10 |

Table V

| Operating Days | pH of solvent of the prior art | pH of New Solvent | Operating Days |
|---|---|---|---|
| 3 | 7.2 | 8.4 | 5 |
| 6 | 8.2 | 7.8 | 6 |
| 7 | 8.9 | 7.4 | 11 |
| 9 | 8.0 | 7.6 | 12 |
| 12 | 6.8 | 7.5 | 15 |
| 13 | [1] 5.0 | 7.3 | 17 |
| 16 | 5.5 | 8.0 | 20 |
| 18 | 5.8 | 7.4 | 22 |
| 19 | 6.9 | 7.4 | 24 |
|  |  | 7.8 | 25 |
| 23 | 7.7 | 7.3 | 27 |
| 24 | 6.9 | 7.3 | 30 |
| 27 | 7.1 | 7.6 | 33 |
| 30 | 6.7 | 7.6 | 39 |

[1] Solvent replenished.

What we claim is:

1. A composition of matter comprising trichloroethylene containing from about 0.001% to 0.2% by weight of triethylamine, from about 0.01% to 1.0% by weight of a compound selected from the group consisting of propylene oxide and butylene oxide, from about 0.01% to 1.0% by weight of styrene oxide and a minor amount of N-methyl pyrrole.

2. A composition of matter comprising trichloroethylene containing from about 0.001% to 0.2% by weight of triethylamine, from 0.1% to 1.0% of butylene oxide, from about 0.01% to 1.0% by weight of styrene oxide and minor amounts of N-methyl pyrrole and diisobutylene.

References Cited in the file of this patent

UNITED STATES PATENTS

| 1,925,602 | Pitman | Sept. 5, 1933 |
| 2,364,588 | Morris et al. | Dec. 5, 1944 |
| 2,435,312 | Klabunde | Feb. 3, 1948 |
| 2,492,048 | Klabunde | Dec. 20, 1949 |
| 2,797,250 | Copelin | June 25, 1957 |